(12) United States Patent
Nanda et al.

(10) Patent No.: US 11,663,354 B1
(45) Date of Patent: May 30, 2023

(54) ASSIGNMENT AND DYNAMIC APPLICATION OF A PERMISSION RULE TO A GROUP OF ENTITIES

(71) Applicant: People Center, Inc., San Francisco, CA (US)

(72) Inventors: Himanshu Nanda, Firozpur (IN); Steven Luis Cipolla, San Francisco, CA (US); Siddhartha Gunda, Milpitas, CA (US); Kyle Michael Boston, San Carlos, CA (US); Yu Dong, San Francisco, CA (US); Alexander Giordano Biz, San Jose, CA (US)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

(21) Appl. No.: 17/587,577

(22) Filed: Jan. 28, 2022

(30) Foreign Application Priority Data

Oct. 13, 2021 (IN) .............................. 202121046643

(51) Int. Cl.
*G06F 16/00* (2019.01)
*G06F 21/62* (2013.01)
*G06F 16/28* (2019.01)
*G06F 16/242* (2019.01)

(52) U.S. Cl.
CPC ...... *G06F 21/6227* (2013.01); *G06F 16/2433* (2019.01); *G06F 16/289* (2019.01)

(58) Field of Classification Search
CPC .............. G06F 21/6227; G06F 16/289; G06F 16/2433; G06F 21/6218; G06F 2221/2141; G06F 21/604
See application file for complete search history.

(56) References Cited

U.S. PATENT DOCUMENTS

| 2013/0160076 | A1 | 6/2013 | Morita | |
|---|---|---|---|---|
| 2014/0075492 | A1* | 3/2014 | Kapadia | G06F 21/604 726/1 |
| 2016/0352743 | A1 | 12/2016 | VerWeyst et al. | |
| 2019/0026484 | A1* | 1/2019 | Aakolk | H04L 63/10 |
| 2019/0334917 | A1* | 10/2019 | Demmler | H04L 63/102 |
| 2021/0392048 | A1* | 12/2021 | Olden | H04L 67/28 |

OTHER PUBLICATIONS

International Search Report and Written Opinion for Application No. PCT/US2022/046066, dated Jan. 26, 2023, 14 pages.

* cited by examiner

*Primary Examiner* — Tony Mahmoudi
*Assistant Examiner* — Suman Rajaputra
(74) *Attorney, Agent, or Firm* — Dority & Manning, P.A.

(57) ABSTRACT

Methods, systems, devices, and tangible non-transitory computer readable media facilitating assignment and/or dynamic application of a permission rule to a group of entities. In an example embodiment, the disclosed technology can: define a group of entities having a common attribute; assign a permission rule to the group of entities based at least in part on the common attribute; project the permission rule onto one or more entities in the group of entities based at least in part on assignment of the permission rule to the group of entities; obtain data indicative of a change in group membership status of an entity in the group of entities; and/or update a projection of the permission rule onto the entity to modify an association of the entity with the group of entities and/or the permission rule based at least in part on receipt of the data.

16 Claims, 5 Drawing Sheets

US 11,663,354 B1

ASSIGNMENT AND DYNAMIC APPLICATION OF A PERMISSION RULE TO A GROUP OF ENTITIES

PRIORITY CLAIM

The present application is based on and claims priority to Indian Provisional Patent Application No. 202121046643, having a filing date of Oct. 13, 2021, which is incorporated by reference herein.

FIELD

The present disclosure relates generally to permission rules respectively assigned to entities associated with a computing environment. More particularly, the present disclosure relates to the assignment and dynamic application of a permission rule to a group of entities associated with a computing environment.

BACKGROUND

Some existing access control models used by organizations employ access control lists to individually create, manage, and/or implement different permission rules (e.g., access rights and/or privileges) respectively corresponding to various entities of the organization. The access control lists are based on a one-to-one relationship between a certain organization role and a set of permission rules assigned to that organization role such that the set of permission rules are relative to (e.g., dependent on and/or correspond to) the organization role. A problem with such access control models is that the organization is tasked with creating and managing (e.g., assigning, revoking, etc.) permission rules corresponding to each organization role. Specifically, a problem with such access control models is that the organization is tasked with creating and managing permission rules corresponding to each individual entity as the entity joins the organization, leaves the organization, and/or changes their role within the organization. Another problem with such access control models is that they do not provide for assignment of a permission rule to a group of entities (e.g., where the permission rule can be relative to an organization role of one or more of the entities), nor do they allow for such a permission rule to be applied dynamically.

SUMMARY

Aspects and advantages of embodiments of the present disclosure will be set forth in part in the following description, or can be learned from the description, or can be learned through practice of the embodiments.

According to an example embodiment of the present disclosure, a computing system can include one or more processors. The computing system can further include one or more memory devices that can store instructions that, when executed by the one or more processors, can cause the computing system to perform operations. The operations can include maintaining multiple sets of data objects that can respectively correspond to multiple entities. The multiple sets of data objects can include attributes that can respectively correspond to the multiple entities. The operations can further include defining a group of entities from the multiple entities. The group of entities can include at least one common attribute from the multiple sets of data objects. The operations can further include assigning a permission rule to the group of entities based at least in part on the at least one common attribute. The operations can further include projecting the permission rule onto one or more entities in the group of entities based at least in part on assignment of the permission rule to the group of entities. The operations can further include obtaining data indicative of a change in group membership status of an entity in the group of entities. The operations can further include updating a projection of the permission rule onto the entity to modify an association of the entity with at least one of the group of entities or the permission rule based at least in part on receipt of the data indicative of the change in the group membership status of the entity.

According to another example embodiment of the present disclosure, a computer-implemented method to assign and dynamically apply a permission rule to a group of entities can include maintaining, by a computing system operatively coupled to one or more processors, multiple sets of data objects that can respectively correspond to multiple entities. The multiple sets of data objects can include attributes that can respectively correspond to the multiple entities. The computer-implemented method can further include defining, by the computing system, a group of entities from the multiple entities. The group of entities can include at least one common attribute from the multiple sets of data objects. The computer-implemented method can further include assigning, by the computing system, a permission rule to the group of entities based at least in part on the at least one common attribute. The computer-implemented method can further include projecting, by the computing system, the permission rule onto one or more entities in the group of entities based at least in part on assignment of the permission rule to the group of entities. The computer-implemented method can further include obtaining, by the computing system, data indicative of a change in group membership status of an entity in the group of entities. The computer-implemented method can further include updating, by the computing system, a projection of the permission rule onto the entity to modify an association of the entity with at least one of the group of entities or the permission rule based at least in part on receipt of the data indicative of the change in the group membership status of the entity.

According to yet another example embodiment of the present disclosure, one or more tangible non-transitory computer-readable media can store computer-readable instructions that when executed by one or more processors can cause the one or more processors to perform operations. The operations can include maintaining multiple sets of data objects that can respectively correspond to multiple entities. The multiple sets of data objects can include attributes that can respectively correspond to the multiple entities. The operations can further include defining a group of entities from the multiple entities. The group of entities can include at least one common attribute from the multiple sets of data objects. The operations can further include assigning a permission rule to the group of entities based at least in part on the at least one common attribute. The operations can further include projecting the permission rule onto one or more entities in the group of entities based at least in part on assignment of the permission rule to the group of entities. The operations can further include obtaining data indicative of a change in group membership status of an entity in the group of entities. The operations can further include updating a projection of the permission rule onto the entity to modify an association of the entity with at least one of the group of entities or the permission rule based at least in part on receipt of the data indicative of the change in the group membership status of the entity.

Other embodiments of the present disclosure are directed to various systems, apparatuses, non-transitory computer-readable media, computer-implemented methods, entity interfaces, and/or devices that can facilitate assignment and/or dynamic application of a permission rule to a group of entities associated with a computing environment.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
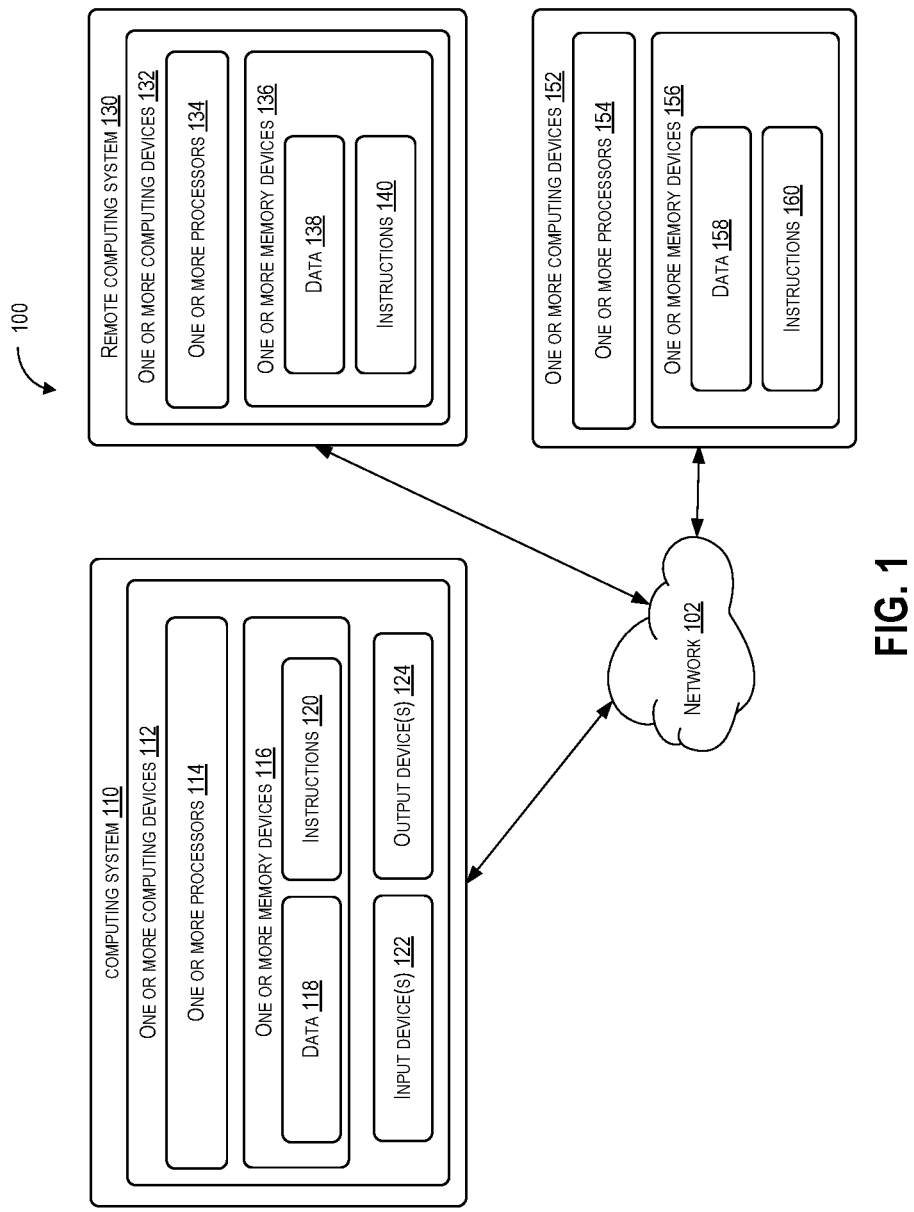
FIG. 1 depicts a block diagram of an example, non-limiting computing environment that can facilitate assignment and/or dynamic application of a permission rule to a group of entities in accordance with one or more example embodiments of the present disclosure.

Reference numerals that are repeated across multiple figures are intended to identify the same features in various embodiments.

DETAILED DESCRIPTION

Reference now will be made in detail to embodiments, one or more examples of which are illustrated in the figures. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that embodiments of the present disclosure cover such modifications and variations.

As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims. As referenced herein, the terms "or" and "and/or" are generally intended to be inclusive, that is (i.e.), "A or B" or "A and/or B" are each intended to mean "A or B or both." As referred to herein, the terms "first," "second," "third," etc. can be used interchangeably to distinguish one component or entity from another and are not intended to signify location, functionality, or importance of the individual components or entities. As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

The present disclosure is generally directed to the assignment and/or dynamic application of a permission rule to a group of entities associated with a computing environment. More specifically, the present disclosure is directed to a computing environment that can include a computing system that can facilitate assignment and/or dynamic application of a permission rule to a group of entities associated with the computing environment in accordance with at least one embodiment described herein. In one or more embodiments described herein, the permission rule can be indicative of an access right to access at least one of data or functionality of a computing environment. In these one or more embodiments, such a computing environment can constitute and/or include a computing system and/or a computing network of, for example, an organization (e.g., a company) and/or the different entities can constitute, for instance, members of the organization (e.g., employees of a company). In at least one embodiment of the present disclosure, dynamic application of the permission rule to a group of entities can describe the application of the permission rule to the group of entities before and/or after there is a change in group membership status of at least one entity in the group of entities (e.g., before and/or after an entity is associated with the group or disassociated with the group).

According to one or more embodiments of the present disclosure, the above-described computing environment can constitute, include, and/or otherwise be associated with a computing system that can include and/or be coupled (e.g., communicatively, operatively, etc.) to one or more processors and/or one or more memory devices. In one or more embodiments described herein, the one or more memory devices can store instructions that, when executed by the one or more processors, can cause the computing system to perform one or more operations. In accordance with one or more embodiments of the present disclosure, execution of such instructions can cause the computing system to perform one or more operations described below. In these one or more embodiments, the computing system can perform such one or more operations described below to facilitate assignment and/or dynamic application of a permission rule to a group of entities. In one or more example embodiments, computing system 110, remote computing system 130, one or more computing devices 152, and/or computing device 200 described below with reference to the example embodiments depicted in FIGS. 1 and 2 can perform such one or more operations described below to facilitate assignment and/or dynamic application of a permission rule to a group of entities.

To facilitate assignment and/or dynamic application of a permission rule to a group of entities according to one or more embodiments of the present disclosure, the above-described computing system (e.g., computing system 110) can, for example, generate and/or maintain a single, centralized database (e.g., a multi-tenant database) that can include a plurality of data models (e.g., data graphs). In these one or more embodiments, the plurality of data models can respectively correspond to different entities that can be associated with the computing environment. In these one or more embodiments, the plurality of data models can constitute multiple sets of data objects that can respectively correspond to the different entities, where such multiple sets of data objects can each include attributes that can respectively correspond to the different entities.

According to one or more embodiments described herein, the above-described computing system can define a group of entities from multiple entities associated with, for example, an organization, where the group of entities can include at least one common attribute from the above-described multiple sets of data objects. For example, each of the entities in the group of entities can include the at least one common attribute. To define the group of entities according to at least one embodiment of the present disclosure, the computing system can employ a predefined query language to query the multiple sets of data objects to identify the group of entities comprising the at least one common attribute. In some embodiments, such a predefined query language can constitute a special-purpose and/or customized query language that can be specific to an organization.

In one or more embodiments of the present disclosure, the above-described predefined query language can constitute a domain-specific query language that can be used by the above-described computing system to perform (e.g., at configuration time, at runtime, in real time, etc.) queries against the multiple sets of data objects. In some embodiments, the computing system can employ the predefined query language to define functions and/or queries that can return data that satisfies and/or responds to the functions and/or queries, respectively. In some embodiments, the predefined query language can constitute and/or include a declarative language. In some embodiments, the predefined query language can include functions and/or operators (e.g., organization functions and/or operators specific to an organization) that can leverage relationships within certain data (e.g., organizational relationships and/or relationships between entities within an organization and/or within organizational data). For example, an organization function defined as "ORG (entity,relationship)" can return one or more entities that have a specified relationship with a specified entity. In another example, an organization function defined as "ORG (employee,relationship)" can return one or more employees that have a specified relationship with a specified employee.

In accordance with one or more embodiments of the present disclosure, the above-described computing system can assign a permission rule to the group of entities based at least in part on the at least one common attribute. In one or more embodiments, the group of entities can include at least one first entity to which the permission rule is assigned. For example, the computing system can assign a permission rule to one or more managers of a certain department in an organization (e.g., engineering department) that are located in a certain geographic location (e.g., San Francisco, Calif.). In one or more embodiments, the group of entities can include at least one second entity to which the permission rule is applied. For example, the computing system can assign a permission rule to one or more managers of a certain department in an organization (e.g., engineering department) that are located in a certain geographic location (e.g., San Francisco, Calif.), where such a permission rule can be applied to one or more employees that are managed by and/or report to the above-described one or more managers.

In one or more embodiments, the above-described computing system can employ the above-described predefined query language to query the multiple sets of data objects to identify at least one first entity to which the permission rule is assigned. For example, the computing system can employ the predefined query language to query the multiple sets of data objects to identify one or more managers of a certain department in an organization (e.g., engineering department) that are located in a certain geographic location (e.g., San Francisco, Calif.). In this example, the permission rule can be assigned to such one or more managers. In one or more embodiments, the computing system can employ the predefined query language to query the multiple sets of data objects to identify at least one second entity to which the permission rule is applied. For example, the computing system can employ the predefined query language to query the multiple sets of data objects to identify one or more employees that are managed by and/or report to the above-described one or more managers. In this example, the permission rule can be applied to such one or more employees that are managed by and/or report to the one or more managers.

According to one or more embodiments of the present disclosure, the above-described computing system can project the permission rule onto one or more entities in the group of entities based at least in part on assignment of the permission rule to the group of entities. For example, in some embodiments, the computing system can facilitate assignment of the permission rule to the group of entities by generating a mapping of the permission rule to the group of entities. In these example embodiments, the computing system can query the multiple sets of data objects as described above to identify the at least one first entity to which the permission rule can be assigned and/or to identify the at least one second entity to which the permission rule can be applied. In these example embodiments, the computing system can further associate the permission rule with the at least one first entity and/or the at least one second entity, where such association can constitute a projection of the permission rule onto the at least one first entity and/or the at least one second entity.

In accordance with at least one example embodiment of the present disclosure, the above-described computing system can store a mapping of the permission rule to the group of entities. For example, the computing system can store such a mapping in a group access control list. In some embodiments, such a group access control list can constitute and/or include an object, an information structure, and/or an instance of a class in a data model that can be generated (e.g., by the computing system) using one or more unified modeling language (UML) components, characteristics, definitions, and/or operations. According to some embodiments, the computing system can store at least one projection of the permission rule onto one or more entities in the group of entities. For example, the computing system can store such a projection(s) of the permission rule in a group-entity access control list. In some embodiments, such a group-entity access control list can constitute and/or include an object, an information structure, and/or an instance of a class in a data model that can be generated (e.g., by the computing system) using one or more UML components, characteristics, definitions, and/or operations. In the above example embodiments, such a group access control list and/or group-entity access control list can be stored (e.g., saved) in one or more memory devices associated with and/or include in the computing system.

According to one or more embodiments described herein, the above-described computing system can obtain data indicative of a change in group membership status of an entity in the group of entities. For example, the computing system can obtain data indicating that an entity in the group of entities has recently joined (e.g., hired) and/or departed (e.g., resigned) from an organization that operates and/or is otherwise associated with the computing system. In another example, the computing system can obtain data indicating that an entity in the group of entities has recently begun working in a different role and/or capacity (e.g., in a different employee position) within the organization. In these examples, the computing system can obtain such data indicative of a change in group membership status of an entity in the group of entities via, for instance, one or more interface components of the computing system such as, for example, via a graphical user interface (GUI) and/or one or more input and/or output devices of the computing system (e.g., a display, a monitor, a keyboard, a mouse, a touchscreen, a microphone, etc.). In the above examples, such data indicative of a change in group membership status of an entity in the group of entities can constitute data that indicates that the permission rule assigned to the group of entities is now assigned to the entity, no longer assigned to the entity, applicable to the entity, or no longer applicable to the entity. Consequently, in accordance with at least one embodiment described herein, the computing system can define and/or modify an association of the entity with the group of entities and/or the permission rule assigned to the group of entities as described below, for instance.

In accordance with at least one example embodiment of the present disclosure, to define and/or modify an association of the entity with the group of entities and/or the permission rule assigned to the group of entities based at least in part on receipt of the data indicative of the change in the group membership status of the entity, the above-described computing system can define and/or update one or more projections of the permission rule onto the entity. For example, in one embodiment, based at least in part on receipt of data indicating the entity has recently joined or changed roles within an organization that operates and/or is otherwise associated with the computing system, the computing system can define a new projection of the permission rule onto the entity and/or store such a new projection in the above-described group-entity access control list. In another example embodiment, based at least in part on receipt of data indicating the entity has recently departed from or changed roles within such an organization, the computing system can update (e.g., delete, remove, etc.) an existing projection of the permission rule onto the entity, where such an existing projection can be stored in the above-described group-entity access control list before and/or after such an update. In the above example embodiments, by defining and/or updating one or more projections of the permission rule onto the entity in accordance with at least one embodiment described herein, the computing system can thereby define and/or modify an association of the entity with the group of entities and/or the permission rule based at least in part on receipt of the data indicative of the change in the group membership status of the entity.

In one or more example embodiments described herein, the above-described computing system can evaluate at least one projection (e.g., a newly defined and/or modified projection) of the permission rule onto one or more entities in the group of entities to determine whether the permission rule is assigned or applied to the one or more entities. In these one or more example embodiments, based at least in part on a determination that the permission rule is assigned or applied to the one or more entities the computing system can respectively grant or deny access by the one or more entities to, for example, data and/or functionality of a computing environment that constitutes, includes, and/or is otherwise associated with the computing system. For instance, in one embodiment, an entity in the group of entities can implement (e.g., employ, operate, etc.) the computing system and/or one or more computing devices thereof in accordance with at least one embodiment described herein. In this example embodiment, based at least in part on such implementation of the computing system and/or the one or more computing devices thereof, the entity can request access to certain data and/or certain functionality of the above-described computing environment. In this example embodiment, the computing system can access the above-described group-entity access control list to evaluate at least one projection (e.g., a newly defined and/or modified projection) of the permission rule onto the entity, where such at least one projection can be stored on the group-entity access control list. In this example embodiment, based at least in part on such evaluation of the at least one projection, the computing system can determine whether the permission rule is assigned or applied to the entity. In this example embodiment, if the computing system determines the permission rule is assigned to the entity, the computing system can grant the entity access to certain data and/or certain functionality of the computing environment. In this example embodiment, if the computing system determines the permission rule is applied to the entity, the computing system can deny the entity access to such data and/or functionality of the computing environment.

Embodiments of the present disclosure can provide numerous technical effects and/or benefits. For example, the disclosed technology can be implemented by the above-described computing system according to one or more embodiments of the present disclosure to facilitate assignment and/or dynamic application of a permission rule to a group of entities. Consequently, in these one or more embodiments, the disclosed technology can therefore eliminate the individual creation and/or management by the computing system of different permission rules (e.g., access rights and/or privileges) respectively corresponding to various entities associated with the computing system (e.g., various entities or employees of an organization that operates and/or is otherwise associated with the computing system). Further, in these one or more embodiments, by eliminating the individual creation and/or management by the computing system of such different permission rules respectively corresponding to such various entities, the disclosed technology can facilitate improved efficiency, improved capacity, improved performance, and/or reduced computational costs of the computing system and/or one or more processors that can be included with and/or employed by the computing system to, for example, execute one or more operations described herein in accordance with at least one embodiment of the present disclosure.

According to one or more embodiments of the present disclosure, the disclosed technology described herein can provide further technical effects and/or benefits including an improvement in the assignment and/or dynamic application of permission rules to various entities associated with a computing environment. In particular, in example embodiments, the disclosed technology can assist an entity (e.g., an administrator of organizational data) in performing a technical task by way of a continued and/or guided human-machine interaction process in which the entity can interact with an entity interface (e.g., a GUI) that can be used to facilitate assignment and/or dynamic application of a permission rule to a group of entities associated with a computing environment (e.g., a computing system and/or computing network operated and/or implemented by an organization). Furthermore, in various embodiments, the disclosed technology can also provide benefits including improvements in computing resource usage efficiency, security, and ease of use.

In accordance with at least one example embodiment of the present disclosure, the disclosed technology can further provide a variety of technical effects and benefits with respect to the efficiency of utilizing computing resource usage by increasing the accuracy associated with the creation and/or management of permission rules corresponding to multiple entities of a computing environment. For instance, by facilitating the assignment and/or dynamic application of a permission rule to a group of entities the amount of storage space associated with storing a plurality of permission rules respectively corresponding to various entities associated with a computing environment can be reduced, thereby improving storage capacity of one or more memory devices used to store such permission rules.

Further, any of the above-described technical effects and/or benefits of the disclosed technology can also improve the effectiveness of a wide variety of devices and/or services including, for instance, any devices and/or services that rely on the disclosed technology. Accordingly, the improvements offered by the disclosed technology can result in tangible benefits to a variety of applications, devices, and/or systems including mechanical, electronic, and computing systems associated with the creation and/or management of permission rules corresponding to different entities associated with a computing environment.

Example embodiments of the present disclosure are further directed to an organizational management platform that can employ (e.g., via an administrator entity) the above-described computing system (e.g., computing system 110) to control and/or leverage organizational data that can be used by the computing system to manage organizational applications associated with different entities or groups of entities (e.g., groups of employees of an organization) included in a set of entities (e.g., all employees of an organization). In particular, an organizational management platform can employ the computing system to control and/or leverage organizational data that can be used by the computing system to manage organizational applications such as payroll, operations, human resources (e.g., onboarding and offboarding), benefits, information technology and device management, third-party application integration and access, and/or another organization application.

The organizational management platform can hold (e.g., via computing system 110), for each of one or more organizations, a centralized set of organizational data that acts as a single, centralized system of record for all organizational management processes for that organization. Each organization can include a number of entities which are able to access and interact with the organizational management platform. Some entities can have administrative permissions which define whether the entity is able to access and/or modify certain types of organizational data for their organization.

The organizational data for each organization can include data directly entered into the organizational management platform (e.g., via computing system 110) and/or can include data retrieved, pulled, or otherwise obtained (e.g., via computing system 110) from one or more first party and/or third-party applications with which the organizational management platform can have varying levels of integration. This ingestion and storage of data from third-party applications is in contrast to systems which simply sit on top of third-party applications and apply rules at runtime. In some embodiments, the organizational management platform can provide (e.g., via computing system 110) an entity with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some embodiments, be held (e.g., via computing system 110) as one or more object databases. For example, multiple object classes can be defined in the object databases (e.g., via computing system 110). Example object classes include employees, devices, job candidates, benefits policies, documents, pay instances, time cards, and/or other objects. For each object, values can be provided and maintained (e.g., via computing system 110) for one or more attributes, such as location, role, salary, and/or another attribute. Links can be made between different objects (e.g., via computing system 110). For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed (e.g., via computing system 110) to understand or leverage relationships among objects and their attribute(s). In one example, the organizational data can be synthesized (e.g., via computing system 110) into a single graph that can include multiple classes of objects and defines complex relationships among objects and their attribute(s). For example, all workflows, including payroll, information technology (IT), and/or another workflow can be run through one platform and graph (e.g., via computing system 110).

In some embodiments, the organizational data can include organizational structure data. For example, the organizational structure data can be encoded (e.g., via computing system 110) within links or edges defined between objects of the organizational data and/or can be stored as a separate data layer. For example, the organizational structure data can define organizational relationships between objects, including employee objects. As one example, the organizational structure data can indicate that a first employee object has the relationship of "manager" relative to a second employee object. The organizational relationships can be defined (e.g., via computing system 110) between specific objects and/or groups of objects. As another example, the organizational structure data can indicate that a first group of employees (e.g., the "IT Administrator" group of employees) has a certain set of permissions (e.g., device activation and/or deactivation) relative to a particular group of devices (e.g., the "work laptops" group of the devices).

In one or more example embodiments described herein, the above-described organizational management platform (e.g., via computing system 110) can employ a domain-specific query language (e.g., the above-described pre-defined query language) that can perform (e.g., at configuration time, at runtime, in real time, etc.) queries against the organizational data. In some embodiments, the organizational management platform (e.g., via computing system 110) can employ the domain-specific query language to define functions and/or queries that can return data that satisfies and/or responds to the functions and/or queries, respectively. In some embodiments, the domain-specific query language can constitute and/or include a declarative language. In some embodiments, the domain-specific query language can include organization functions and/or operators that can leverage organizational relationships within organizational data. For example, an organization function defined as "ORG(employee,relationship)" can return one or more employees that have a specified relationship with a specified employee.

With reference to the figures, example embodiments of the present disclosure are described below in further detail.

FIG. 1 depicts a block diagram of an example, non-limiting computing environment 100 that can facilitate assignment and/or dynamic application of a permission rule to a group of entities in accordance with one or more example embodiments of the present disclosure. In the example embodiment depicted in FIG. 1, computing environment 100 can include a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and/or instructions 160.

Network 102 according to one or more embodiments of the present disclosure can include any type of communications network. For example, in some embodiments, network 102 can include a local area network (LAN), a wide area network (WAN), an intranet, an extranet, and/or the Internet. Further, in at least one embodiment, network 102 can include any number of wired or wireless connections and/or links that can be used to communicate with one or more systems (e.g., computing system 110 and/or remote computing system 130) and/or one or more devices (e.g., one or more computing devices 152). Communication over network 102 according to one or more embodiments of the present disclosure can be performed via any type of wired and/or wireless connection and/or can use a wide variety of communication protocols (e.g., TCP/IP, HTTP, SMTP, FTP), encodings or formats (e.g., HTML, XML), and/or protection schemes (e.g., VPN, secure HTTP, SSL).

Computing system 110 according to one or more embodiments of the present disclosure can include any combination of systems and/or devices including one or more computing systems and/or one or more computing devices. Further, in some embodiments, computing system 110 can be connected (e.g., networked) to one or more computing systems and/or one or more computing devices via network 102. Computing system 110 can operate in various different configurations including as a server or a client machine in client-server network environment, or as a peer machine in a peer-to-peer (or distributed) network environment. Though computing system 110 is depicted in FIG. 1 as a single device, computing system 110 according to one or more embodiments of the present disclosure can include any collection or combination of devices that individually or in combination with other devices, execute a set of one or more instructions to perform any one or more of the operations discussed herein.

In this example, computing system 110 can include one or more computing devices 112, which can include any type of computing device. For example, one or more computing devices 112 can include a personal computing device (e.g., a desktop computing device), a mobile computing device (e.g., a smartphone or tablet), a wearable computing device (e.g., a smartwatch), an embedded computing device, a web appliance, a server, a network router, a switch, a bridge, or any device capable of executing a set of instructions (e.g., any combination of instructions which can include sequential instructions and/or parallel instructions) associated with one or more operations and/or one or more actions to be performed by computing system 110 or any of the constituent components and/or devices of computing system 110.

As illustrated in the example embodiment depicted in FIG. 1, one or more computing devices 112 can include one or more processors 114. In at least one embodiment described herein, one or more processors 114 can be and/or include any processing device (e.g., a processor core, a microprocessor, an application-specific integrated circuit (ASIC), a field-programmable gate array (FPGA), a controller, or a microcontroller) and can include one processor or a plurality of processors that can be coupled to one another (e.g., operatively connected). In some embodiments, one or more processors 114 can include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

In at least one embodiment of the present disclosure, one or more computing devices 112 can include one or more memory devices 116. In these one or more embodiments, one or more memory devices 116 can be used to store data and/or information and can include one or more computer-readable media, one or more non-transitory computer-readable storage media, and/or one or more machine-readable media. Though one or more memory devices 116 are depicted in FIG. 1 as a single unit (e.g., a single medium), the computer-readable storage media according to one or more embodiments of the present disclosure can include a single medium or multiple media (e.g., a centralized or distributed database, and/or associated caches and servers) that can store one or more sets of instructions. Further, in these one or more embodiments, the computer-readable storage media can include any medium that can: store, encode, and/or carry a set of instructions to be executed by a computing device; and/or cause the computing device to perform any of the one or more operations described herein. In some embodiments, the computer-readable storage media can include one or more solid-state memories, one or more optical media, and/or one or more magnetic media. In at least one embodiment described herein, one or more memory devices 116 can include, for instance, random access memory (RAM), read only memory (ROM), erasable programmable read only memory (EPROM), electrically erasable programmable read only memory (EEPROM), one or more flash memory devices, one or more magnetic storage devices (e.g., one or more hard disk drives), and/or another type of memory device.

In accordance with at least one embodiment described herein, one or more processors 114 can be configured to execute one or more instructions to perform the operations described herein including, for example, one or more operations associated with assignment and/or dynamic application of a permission rule to a group of entities. Further, one or more memory devices 116 can store data 118 and/or instructions 120, which can be executed by one or more processors 114 to cause one or more computing devices 112 to perform one or more operations.

Data 118 according to one or more embodiments of the present disclosure can include organizational data. For example, in at least one embodiment, data 118 can include organizational data associated with one or more entities of an organization (e.g., data associated with one or more employees of a company). Further, in one or more embodiments, instructions 120 can include one or more instructions to use data including data 118 to perform the one or more operations described herein. In some embodiments, one or more memory devices 116 can be used to store one or more applications that can be operated by one or more processors 114. In at least one embodiment described herein, data 118, instructions 120, and/or the one or more applications can be associated with an organization (e.g., a company). Further, in some embodiments, computing system 110 can be configured to manage the one or more applications. For example, in these embodiments, computing system 110 can perform one or more operations associated with: accessing organizational data (e.g., accessing organizational data stored in a multi-tenant database and/or an object-based database); assigning a permission rule to a group of entities; and/or dynamically applying the permission rule to the group of entities.

Data 118 can, in some embodiments, be held and/or structured as one or more object databases. For example, in at least one embodiment, data 118 can be structured as an object database having one or more object classes defined therein. In some embodiments, such one or more object classes can include, for instance, employees, devices, job candidates, benefits policies, documents, pay instances, time cards, and/or another object class. In these embodiments, each object class can include one or more attributes such as, for instance, location, role, salary, and/or another attribute, where each of such one or more attributes can have a corresponding value. In some embodiments, data 118 can be structured as an object database that can include multiple object classes having one or more links between at least two of the object classes. For example, one or more device object classes can be associated with one or more employee object classes.

As illustrated in the example embodiment depicted in FIG. 1, one or more computing devices 112 can include one or more input devices 122 and/or one or more output devices 124. In accordance with at least one embodiment described herein, one or more input devices 122 can be configured to receive input (e.g., entity input) and can include one or more touch screens, one or more keyboards, one or more pointing devices, (e.g., mouse device), one or more buttons, one or more microphones, and/or one or more cameras. In one or more embodiments of the present disclosure, one or more output devices 124 can include one or more display devices, one or more loudspeaker devices, one or more haptic output devices, and/or another output device. By way of example, in some embodiments, one or more output devices 124 can be used to display a graphical user interface (GUI) via a display device that can include a touch screen layer that can be configured to detect one or more entity inputs.

Remote computing system 130 according to one or more embodiments of the present disclosure can include one or more computing devices 132. In at least one embodiment described herein, one or more computing devices 132 can respectively include one or more processors 134, one or more memory devices 136, data 138, and/or instructions 140. In at least one embodiment of the present disclosure, one or more processors 134, one or more memory devices 136, data 138, and/or instructions 140 can respectively include any of the attributes and/or capabilities of one or more processors 114, one or more memory devices 116, data 118, and/or instructions 120. Further, in one or more embodiments described herein, one or more processors 134 and/or one or more memory devices 136 can each be configured to respectively perform any of the operations performed by one or more processors 114 and/or one or more memory devices 116.

In one or more embodiments of the present disclosure, remote computing system 130 can include any of the attributes and/or capabilities of computing system 110 and/or can be configured to perform any of the operations performed by computing system 110. Further, in at least one embodiment, remote computing system 130 can communicate with one or more devices and/or one or more systems via network 102. Remote computing system 130 according to one or more embodiments of the present disclosure can include one or more applications (e.g., computing software applications) that can be stored and/or executed by remote computing system 130. Further, in some embodiments, the one or more applications can include one or more applications that can be accessed from computing system 110 and/or can be at least partly operated from remote computing system 130. Further, in at least one embodiment, data 138 can include one or more portions of the above-described organizational data.

In one or more embodiments of the present disclosure, one or more computing devices 152 can respectively include one or more processors 154, one or more memory devices 156, data 158, and/or instructions 160. In at least one embodiment of the present disclosure, one or more processors 154, one or more memory devices 156, data 158, and/or instructions 160 can respectively include any of the attributes and/or capabilities of one or more processors 114, one or more memory devices 116, data 118, and/or instructions 120. Further, in one or more embodiments described herein, one or more processors 154 and/or one or more memory devices 156 can each be configured to respectively perform any of the operations performed by one or more processors 114 and/or one or more memory devices 116. In at least one embodiment, one or more computing devices 152 can respectively communicate with one or more devices and/or one or more systems via network 102.

In some embodiments, any of one or more computing devices 152 can include one or more applications (e.g., computing software applications) that can be respectively stored and/or executed by one or more computing devices 152. Further, in some embodiments, the one or more applications can include one or more applications that can be accessed from computing system 110 and/or can be at least partly operated from any of one or more computing devices 152. Further, in at least one embodiment, data 158 can include one or more portions of the above-described organizational data.

Figure 2:
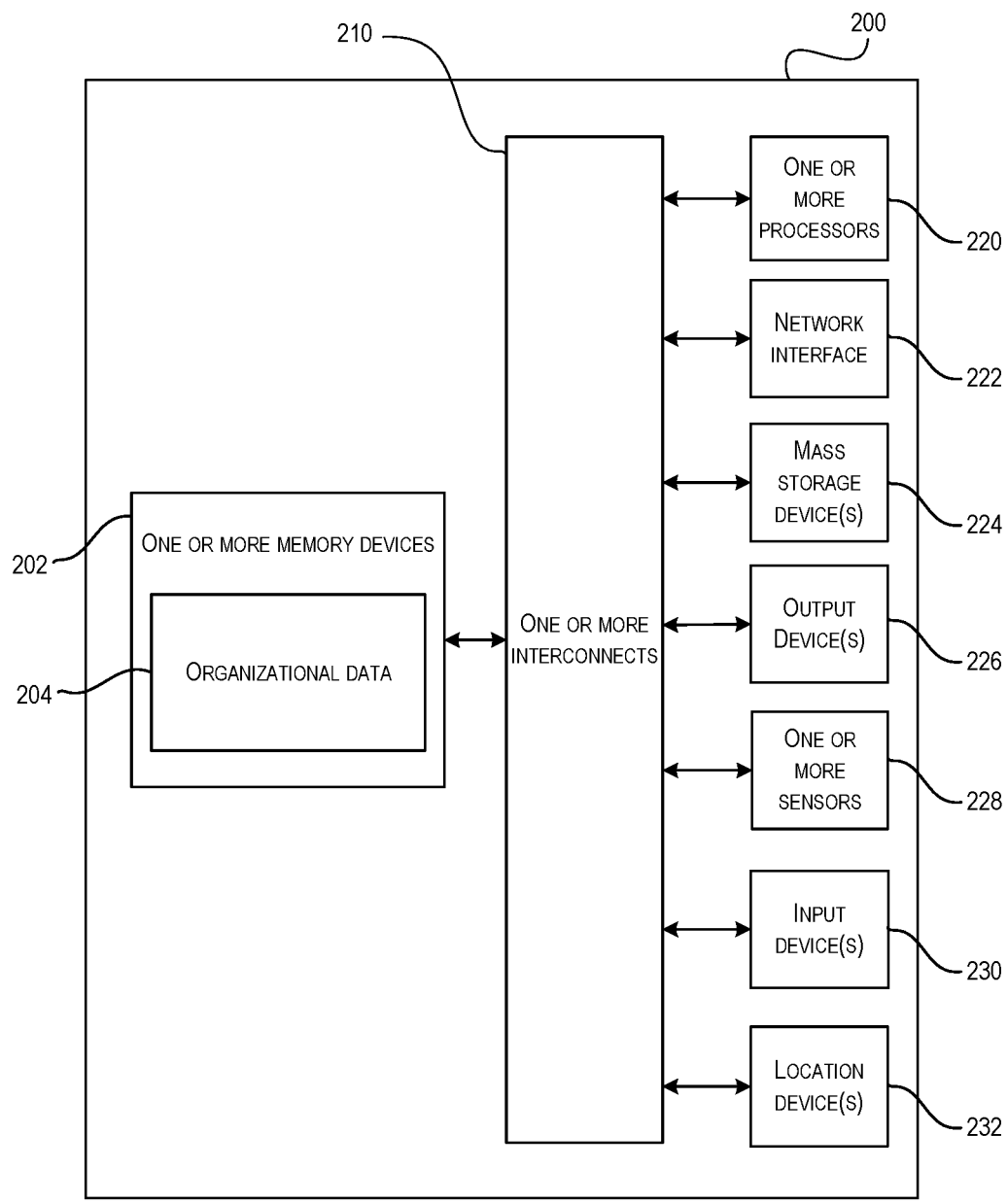
FIG. 2 depicts a block diagram of an example, non-limiting computing device that can facilitate assignment and/or dynamic application of a permission rule to a group of entities in accordance with one or more example embodiments of the present disclosure.

FIG. 2 depicts a block diagram of an example, non-limiting computing device 200 that can facilitate assignment and/or dynamic application of a permission rule to a group of entities in accordance with one or more example embodiments of the present disclosure. Computing device 200 according to one or more embodiments of the present disclosure can include one or more attributes and/or capabilities of computing system 110, remote computing system 130, and/or one or more computing devices 152 described above with reference to the example embodiment depicted in FIG. 1. Furthermore, computing device 200 can be configured to perform one or more operations and/or one or more actions that can be performed by computing system 110, remote computing system 130, and/or one or more computing devices 152.

As illustrated in the example embodiment depicted in FIG. 1, computing device 200 can include one or more memory devices 202, organizational data 204, one or more interconnects 210, one or more processors 220, a network interface 222, one or more mass storage devices 224, one or more output devices 226, one or more sensors 228, one or more input devices 230, and/or one or more location devices 232.

In one or more embodiments of the present disclosure, one or more memory devices 202 can store information and/or data (e.g., organizational data 204). Further, in some embodiments, one or more memory devices 202 can include one or more non-transitory computer-readable storage media, including RAM, ROM, EEPROM, EPROM, flash memory devices, magnetic disks, and/or combinations thereof. In at least one embodiment, the information and/or data stored by one or more memory devices 202 can be executed by one or more processors 220 to cause computing device 200 to perform operations including one or more operations associated with: accessing organizational data (e.g., accessing organizational data stored in a multi-tenant database and/or an object-based database); assigning a permission rule to a group of entities; and/or dynamically applying the permission rule to the group of entities.

Organizational data 204 according to one or more embodiments of the present disclosure can include one or more portions of data (e.g., data 118, data 138, and/or data 158) and/or instructions (e.g., instructions 120, instructions 140, and/or instructions 160) that can be stored in one or more memory devices 116, one or more memory devices 136, and/or one or more memory devices 156, respectively. Furthermore, in some embodiments, organizational data 204 can include information associated with one or more entities (e.g., role(s) of an entity within an organization, payrolls of an entity, regions associated with the entity, etc.). In some embodiments, organizational data 204 can be received from one or more computing systems (e.g., remote computing system 130), where such one or more computing systems can be remote from computing device 200 (e.g., in another room, building, part of town, city, nation, etc.).

In one or more embodiments of the present disclosure, one or more interconnects 210 can include one or more interconnects or buses that can be used to send and/or receive one or more signals (e.g., electronic signals) and/or data (e.g., organizational data 204) between components of computing device 200, including one or more memory devices 202, one or more processors 220, network interface 222, one or more mass storage devices 224, one or more output devices 226, one or more sensors 228 (e.g., a sensor array), one or more input devices 230, and/or one or more location devices 232. In some embodiments, one or more interconnects 210 can be arranged or configured in different ways. For example, in at least one embodiment, one or more interconnects 210 can be configured as parallel or serial connections. Further, in one or more embodiments, one or more interconnects 210 can include: one or more internal buses that can be used to connect internal components of computing device 200; and/or one or more external buses that can be used to connect internal components of computing device 200 to one or more external devices (e.g., one or more devices that can be external to computing device 200). By way of example, in at least one embodiment, one or more interconnects 210 can include different interfaces that can include, for instance, Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or another interface that can be used to connect components.

According to one or more embodiments of the present disclosure, one or more processors 220 can include one or more computer processors that can be configured to execute the one or more instructions that can be stored in one or more memory devices 202. For example, in these one or more embodiments, one or more processors 220 can include one or more general purpose central processing units (CPUs), application specific integrated circuits (ASICs), and/or one or more graphics processing units (GPUs). Further, in at least one embodiment, one or more processors 220 can perform one or more actions and/or operations including one or more actions and/or operations associated with, for instance, organizational data 204. In some embodiments, one or more processors 220 can include single or multiple core devices including a microprocessor, microcontroller, integrated circuit, and/or a logic device.

Network interface 222 according to one or more embodiments of the present disclosure can support network communications. In some embodiments, network interface 222 can support communication via networks that can include, for instance, a local area network and/or a wide area network (e.g., the Internet). For example, in at least one embodiment, network interface 222 can allow computing device 200 to communicate with computing system 110 via network 102.

In one or more embodiments of the present disclosure, one or more mass storage devices 224 (e.g., a hard disk drive and/or a solid state drive) can be used to store data that can include, for instance, organizational data 204. One or more output devices 226 according to one or more embodiments of the present disclosure can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

According to at least one embodiment described herein, one or more sensors 228 can be configured to detect various states and/or can include one or more cameras, one or more light detection and ranging (LiDAR) devices, one or more sonar devices, and/or one or more radar devices. Further, in some embodiments, one or more sensors 228 can be used to provide input (e.g., an image of an entity captured using the one or more cameras) that can be used as part of an entity interface (e.g., a GUI) that can be used to, for instance: access organizational data (e.g., access organization data stored in a multi-tenant database and/or an object-based database); assign a permission rule to a group of entities; and/or dynamically apply the permission rule to the group of entities. For example, one or more sensors 228 can be used to authenticate the identity of an entity based on an image of the entity's face that is captured using one or more sensors 228.

In accordance with at least one embodiment described herein, one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that can be used to detect gestures that can trigger one or more operations by computing device 200).

Although one or more memory devices 202 and one or more mass storage devices 224 are depicted separately in FIG. 2, in some embodiments, one or more memory devices 202 and one or more mass storage devices 224 can be regions within the same memory module. Computing device 200 according to one or more embodiments of the present disclosure can include one or more additional processors, memory devices, and/or network interfaces that can be provided separately or on the same chip or board. In some embodiments, one or more memory devices 202 and one or more mass storage devices 224 can include one or more computer-readable media that can include, for instance, non-transitory computer-readable media, RAM, ROM, hard drives, flash drives, and/or another memory device.

One or more memory devices 202 according to one or more embodiments of the present disclosure can store sets of instructions for applications that can include an operating system that can be associated with various software applications and/or data. For example, in at least one embodiment, one or more memory devices 202 can store sets of instructions for one or more applications that can be subject to one or more security policies that can be generated and/or implemented by computing device 200 and/or one or more other computing devices or one or more computing systems. In some embodiments, one or more memory devices 202 can be used to operate and/or execute a general-purpose operating system that can operate on one or more mobile computing devices and/or stationary devices that can include, for example, smartphones, laptop computing devices, tablet computing devices, and/or desktop computers.

The software applications that can be operated and/or executed by computing device 200 in accordance with at least one embodiment described herein can include, for instance, applications associated with computing system 110, remote computing system 130, and/or one or more computing devices 152 described above with reference to the example embodiment depicted FIG. 1. Further, in some embodiments, such software applications that can be operated and/or executed by computing device 200 can include, for instance, native applications, web services, and/or web-based applications.

According to one or more embodiments of the present disclosure, one or more location devices 232 can include one or more devices and/or circuitry that can determine the position of computing device 200. For example, in at least one embodiment, one or more location devices 232 can determine an actual and/or relative position of computing device 200 by using a satellite navigation positioning system (e.g. a global positioning system (GPS), a Galileo positioning system, the GLObal Navigation satellite system (GLONASS), the BeiDou Satellite Navigation and Positioning system), an inertial navigation system, a dead reckoning system, based on an internet protocol (IP) address, by using triangulation and/or proximity to cellular towers or Wi-Fi hotspots, and/or beacons.

Figure 3:
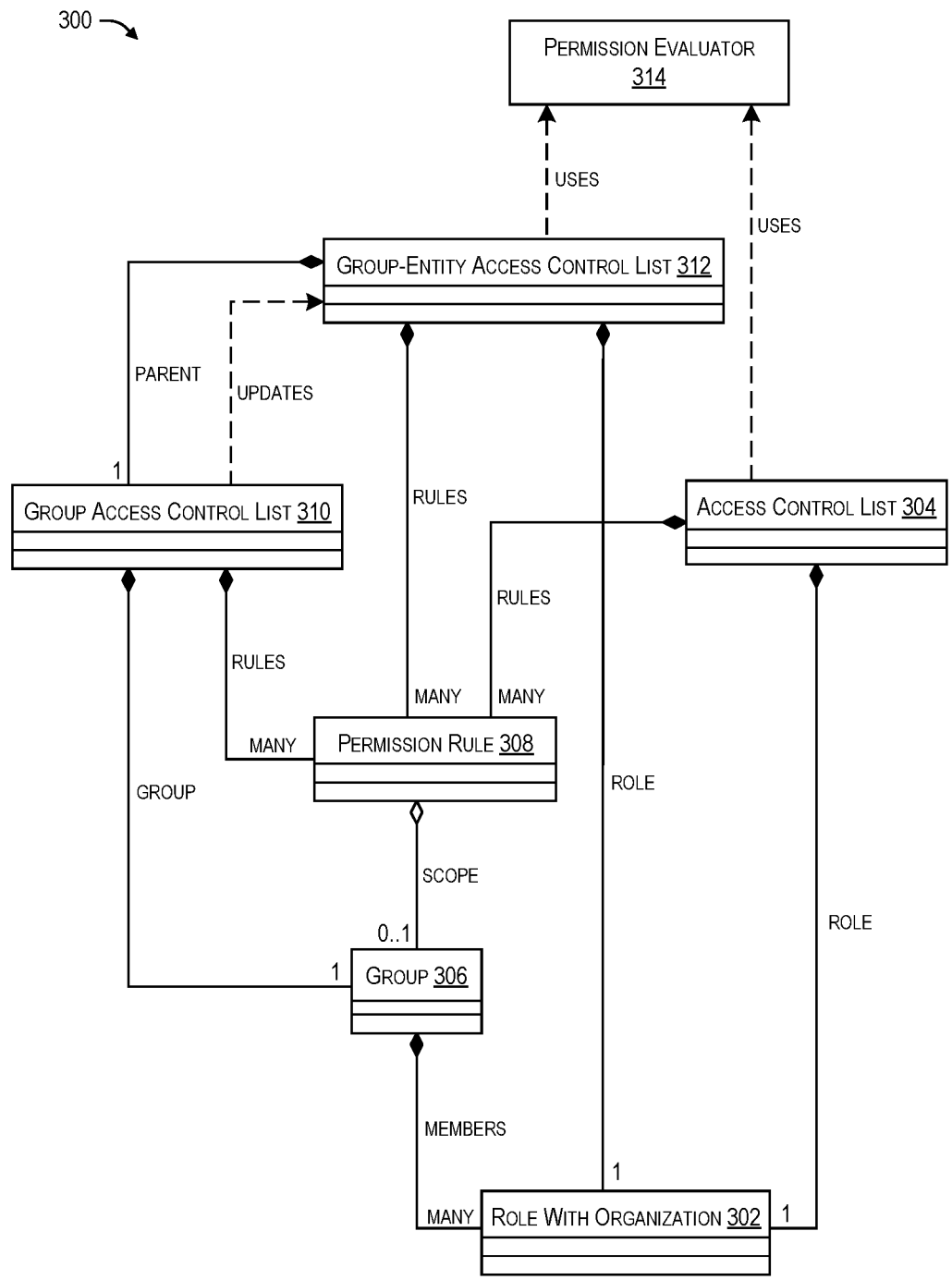
FIG. 3 depicts a block diagram of an example, non-limiting model that can facilitate assignment and/or dynamic application of a permission rule to a group of entities in accordance with one or more example embodiments of the present disclosure.

FIG. 3 depicts a block diagram of an example, non-limiting model 300 that can facilitate assignment and/or dynamic application of a permission rule to a group of entities in accordance with one or more example embodiments of the present disclosure. A computing device that can be used to generate model 300 can include one or more attributes and/or capabilities of computing system 110, remote computing system 130, one or more computing devices 152, and/or computing device 200. Furthermore, such a computing device can be configured to perform one or more operations and/or one or more actions that can be performed by computing system 110, remote computing system 130, one or more computing devices 152, and/or computing device 200.

In the example embodiment depicted in FIG. 3, model 300 and/or one or more components thereof can be generated using a modeling language. For example, in one or more embodiments of the present disclosure, computing system 110, remote computing system 130, one or more computing devices 152, and/or computing device 200 can be employed to generate model 300 and/or one or more components thereof using a modeling language such as, for instance, unified modeling language (UML). Accordingly, in these one or more embodiments, model 300 can constitute a UML diagram such as, for instance, a UML class diagram.

In the example embodiment depicted in FIG. 3, model 300 can constitute a UML class diagram that illustrates one example design embodiment of how the disclosed technology can be implemented to facilitate assignment and/or dynamic application of a permission rule to a group of entities.

In the example embodiment depicted in FIG. 3, model 300 can include multiple classes and/or class instances (e.g., objects). For instance, as illustrated in the example embodiment depicted in FIG. 3, model 300 can include multiple classes and/or class instances (e.g., objects) that can include, but are not limited to, role with organization 302, access control list 304, group 306, permission rule 308, group access control list 310, and/or group-entity access control list 312. In this example embodiment, model 300 can further include a permission evaluator 314.

In the example embodiment depicted in FIG. 3, relationships between such classes, class instances, and/or permission evaluator 314 are represented in model 300 by the various types of connector lines. For instance, in this example embodiment, an aggregation relationship is represented as a line with an open diamond head (e.g., white diamond head) and a composition relationship is represented as a line with a closed diamond head (e.g., black diamond head). In this example embodiment, the dashed lines with open arrow heads represent operations to be performed such as, for instance, updating operations. In the example embodiment depicted in FIG. 3, multiplicity associated with relationships between the classes and/or class instances of model 300 are denoted as numerical representations. For instance, multiplicity represented in model 300 as a "1" signifies a relationship of 1 and only 1, while multiplicity represented in model 300 as "0..1" signifies an optional relationship.

In the example embodiment depicted in FIG. 3, group access control list 310, group-entity access control list 312, and/or access control list 304 can include one or more permission rules 308. For instance, in this example embodiment, an entity having a certain role with organization 302 (e.g., a certain role with a company) can have an access control list 304 and/or a group-entity access control list 312, which in turn can have one or more permission rules 308. Therefore, in this example embodiment, a role with organization 302 can have one or more permission rules 308.

In one or more embodiments of the present disclosure, group 306 in model 300 can use the above-described predefined query language to generate the "group definition" of group 306 (e.g., to define the group of entities). For instance, in these one or more embodiments, group 306 in model 300 can use the above-described domain-specific query language (e.g., a declarative language) to generate the "group definition" of group 306 (e.g., to define the group of entities). In these one or more embodiments, such a group definition of group 306 can define, for example: one or more assignee entities of group 306 (e.g., one or more entities to which permission rule 308 is assigned); one or more entities to which permission rule 308 is applied (e.g., if a permission rule 308 grants permission to modify, for instance, salaries of one or more certain entities, the group definition of group 306 defines such one or more certain entities); and/or approval routing (e.g., approval policy).

In at least one example embodiment, group access control list 310 can constitute a class instance (e.g., an object) that can be used to configure one or more permission rules 308. For instance, in some embodiments, group access control list 310 can be used to define a group 306 (e.g., a group of entities) based at least in part on one or more attributes associated with one or more roles with organization 302. In some embodiments, group access control list 310 can be used to define, modify, and/or store group 306 and/or one or more permission rules 308 that can be assigned to group 306. In these embodiments, when group 306 and/or one or more permission rules 308 that can be assigned thereto are defined and/or modified, a computing system and/or computing device used to implement the disclosed technology (e.g., computing system 110, remote computing system 130, one or more computing devices 152, and/or computing device 200) can perform operations to update mapping and/or associations of an entity in group 306 with one or more permission rules 308. For instance, in these embodiments, based on the creation and/or modification of group 306 and/or one or more permission rules 308 that can be assigned thereto, such a computing system and/or computing device can perform updating operations to update mapping and/or associations between the entity and group 306 and/or between the entity and one or more permission rules 308 that can be assigned to group 306. In the example embodiment depicted in FIG. 3, such updating operations are denoted by the dashed lines with open arrow heads.

In at least one embodiment of the present disclosure, group access control list 310 can include one or more entities to which permission rule 308 is assigned, one or more entities to which permission rule 308 is applied, and/or the corresponding approval policy. In some embodiments, group-entity access control list 312 can constitute a manifestation and/or materialization of permission rule 308 into a form (e.g., format, structure, etc.) that can be input to and/or accepted by permission evaluator 314.

In one or more embodiments, permission evaluator 314 can evaluate one or more (e.g., all) permission rules 308 that can be defined in access control list 304, group access control list 310, and/or group-entity access control list 312 to determine whether a certain permission rule of permission rule 308 is assigned or applied to a certain entity of an organization. In these one or more embodiments, based at least in part on a determination by permission evaluator 314 that permission rule 308 is assigned or applied to the entity, a computing system used to implement the disclosed technology (e.g., computing system 110, remote computing system 130, one or more computing devices 152, and/or computing device 200) can respectively grant or deny the entity access to, for example, data and/or functionality of a computing environment that constitutes, includes, and/or is otherwise associated with such a computing system.

In accordance with at least one embodiment described herein, model 300 and/or one or more components thereof can be stored in one or more memory devices. For example, in some embodiments, model 300 and/or one or more components thereof can be stored in one or more memory devices 116, one or more memory devices 136, one or more memory devices 156, one or more memory devices 202, and/or another memory device. In at least one embodiment described herein, model 300, role with organization 302, access control list 304, group 306, permission rule 308, group access control list 310, and/or group-entity access control list 312 can be stored in one or more memory devices 116, one or more memory devices 136, one or more memory devices 156, one or more memory devices 202, and/or another memory device.

Figure 4:
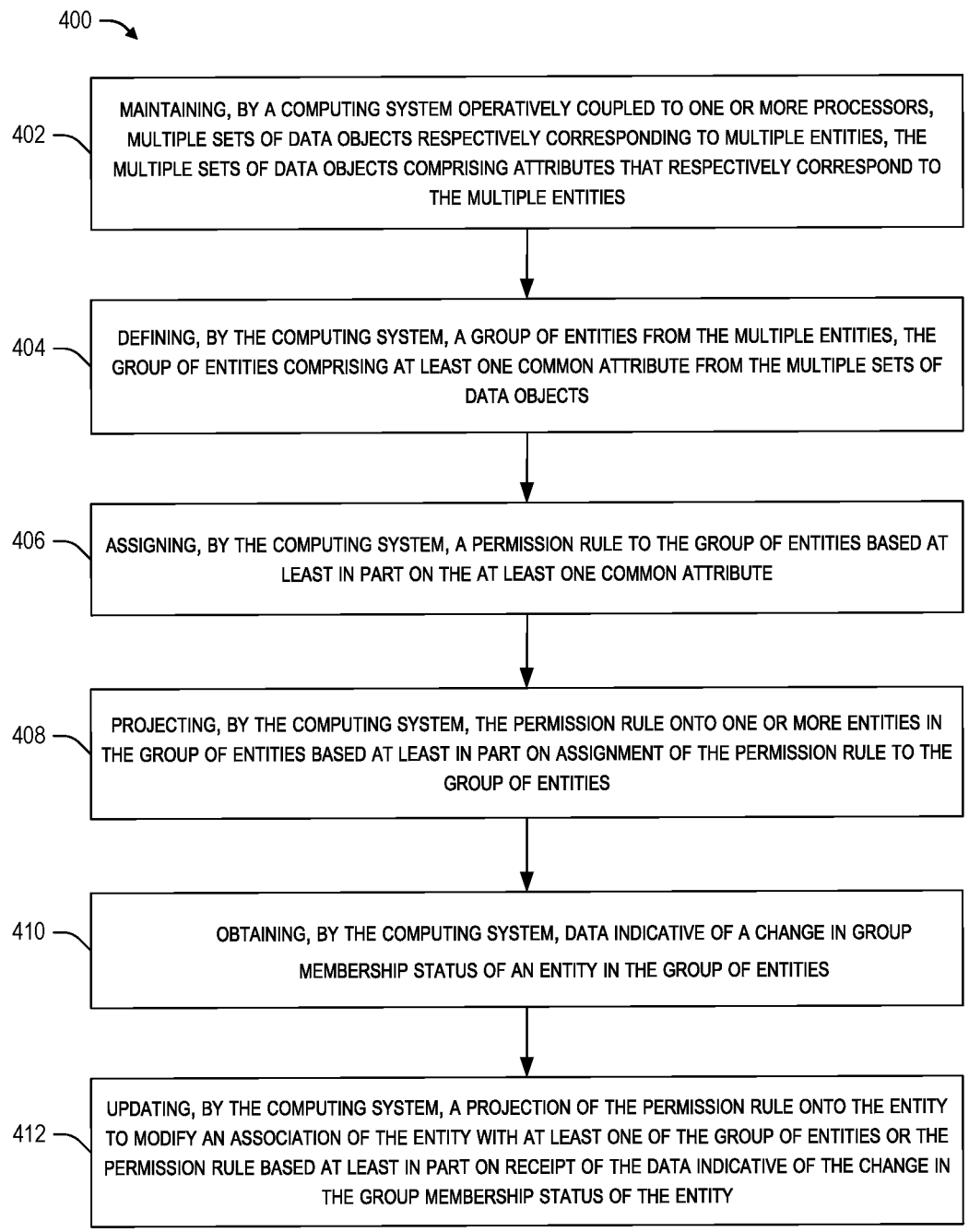
FIGS. 4 and 5 each depict a flow diagram of an example, non-limiting computer-implemented method that can facilitate assignment and/or dynamic application of a permission rule to a group of entities in accordance with one or more example embodiments of the present disclosure.

FIG. 4 depicts a flow diagram of an example, non-limiting computer-implemented method 400 that can facilitate assignment and/or dynamic application of a permission rule to a group of entities in accordance with one or more example embodiments of the present disclosure. One or more portions of computer-implemented method 400 can be executed and/or implemented on one or more computing devices or computing systems including, for example, computing system 110, remote computing system 130, one or more computing devices 152, and/or computing device 200. Further, one or more portions of computer-implemented method 400 can be executed and/or implemented as an algorithm and/or as machine-readable instructions (e.g., computer software) on the hardware devices and/or systems disclosed herein. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 402, computer-implemented method 400 can include maintaining (e.g., in a multi-tenant database), by a computing system operatively coupled to one or more processors (e.g., by computing system 110 and/or one or more processors 114), multiple sets of data objects (e.g., in the form of multiple data models and/or graphs) respectively corresponding to multiple entities (e.g., employees of an organization), the multiple sets of data objects comprising attributes (e.g., role held within an organization, salary, location, etc.) that respectively correspond to the multiple entities. For example, in one or more embodiments described herein, computing system 110 can generate and/or maintain a single, centralized database (e.g., a multi-tenant database) that can include a plurality of data models (e.g., data graphs). In these one or more embodiments, the plurality of data models can respectively correspond to different entities that can be associated with a computing environment (e.g., a computing system and/or computing network that can be operated by and/or otherwise associated with an organization such as, for instance, a company). In these one or more embodiments, the plurality of data models can constitute multiple sets of data objects that can respectively correspond to the different entities, where such multiple sets of data objects can each include attributes that can respectively correspond to the different entities.

At 404, computer-implemented method 400 can include defining, by the computing system (e.g., by computing system 110), a group of entities from the multiple entities, the group of entities comprising at least one common attribute (e.g., location, department, etc.) from the multiple sets of data objects. For example, in one or more embodiments described herein, computing system 110 can define a group of entities from multiple entities associated with, for instance, an organization, where the group of entities can include at least one common attribute from the above-described multiple sets of data objects. For instance, each of the entities in the group of entities can include the at least one common attribute. To define the group of entities according to at least one embodiment of the present disclosure, computing system 110 can employ the above-described predefined query language (e.g., a domain-specific query language, a declarative language, etc.) to query the multiple sets of data objects to identify the group of entities comprising the at least one common attribute. In one or more embodiments, computing system 110 can employ the predefined query language to query the multiple sets of data objects to identify at least one entity to which a permission rule is assigned and/or at least one entity to which the permission rule is applied.

At 406, computer-implemented method 400 can include assigning, by the computing system (e.g., by computing system 110), a permission rule to the group of entities based at least in part on the at least one common attribute. For example, in one or more embodiments described herein, computing system 110 can assign a permission rule to the group of entities based at least in part on the at least one common attribute. In one or more embodiments, the group of entities can include at least one first entity to which the permission rule is assigned. For example, computing system 110 can assign a permission rule to one or more managers of a certain department in an organization (e.g., engineering department) that are located in a certain geographic location (e.g., San Francisco, Calif.). In one or more embodiments, the group of entities can include at least one second entity to which the permission rule is applied. For example, computing system 110 can assign a permission rule to one or more managers of a certain department in an organization (e.g., engineering department) that are located in a certain geographic location (e.g., San Francisco, Calif.), where such a permission rule can be applied to one or more employees that are managed by and/or report to the above-described one or more managers.

At 408, computer-implemented method 400 can include projecting, by the computing system (e.g., by computing system 110), the permission rule onto one or more entities in the group of entities based at least in part on assignment of the permission rule to the group of entities. For example, in one or more embodiments described herein, computing system 110 can project the permission rule onto one or more entities in the group of entities based at least in part on assignment of the permission rule to the group of entities. For instance, in some embodiments, computing system 110 can facilitate assignment of the permission rule to the group of entities by generating a mapping of the permission rule to the group of entities. In these example embodiments, computing system 110 can query the multiple sets of data objects as described above to identify the at least one first entity to which the permission rule can be assigned and/or to identify the at least one second entity to which the permission rule can be applied. In these example embodiments, computing system 110 can further associate the permission rule with the at least one first entity and/or the at least one second entity, where such association can constitute a projection of the permission rule onto the at least one first entity and/or the at least one second entity.

At 410, computer-implemented method 400 can include obtaining, by the computing system (e.g., by computing system 110), data indicative of a change in group membership status of an entity in the group of entities. For example, in one or more embodiments described herein, computing system 110 can obtain data indicative of a change in group membership status of an entity in the group of entities. For instance, computing system 110 can obtain data indicating that an entity in the group of entities has recently joined (e.g., hired) and/or departed (e.g., resigned) from an organization that operates and/or is otherwise associated with computing system 110. In another example, computing system 110 can obtain data indicating that an entity in the group of entities has recently begun working in a different role and/or capacity (e.g., in a different employee position) within the organization. In these examples, computing system 110 can obtain such data indicative of a change in group membership status of an entity in the group of entities via, for instance, one or more interface components of the computing system such as, for example, via a graphical user interface (GUI) and/or one or more input devices (e.g., one or more input devices 122) and/or one or more output devices (e.g., one or more output devices 124) of computing system 110. In the above examples, such data indicative of a change in group membership status of an entity in the group of entities can constitute data that indicates that the permission rule assigned to the group of entities is now assigned to the entity, no longer assigned to the entity, applicable to the entity, or no longer applicable to the entity. Consequently, in accordance with at least one embodiment described herein, computing system 110 can define and/or modify an association of the entity with the group of entities and/or the permission rule assigned to the group of entities.

At 412, computer-implemented method 400 can include updating, by the computing system (e.g., by computing system 110), a projection of the permission rule onto the entity to modify an association of the entity with at least one of the group of entities or the permission rule based at least in part on receipt of the data indicative of the change in the group membership status of the entity. For example, in one or more embodiments described herein, based at least in part on receipt of data indicating the entity has recently departed from or changed roles within an organization, computing system 110 can update (e.g., delete, remove, etc.) an existing projection of the permission rule onto the entity, where such an existing projection can be stored in the above-described group-entity access control list 312 before and/or after such an update. In these one or more embodiments, by updating one or more projections of the permission rule onto the entity in accordance with at least one embodiment described herein, computing system 110 can thereby modify an association of the entity with the group of entities and/or the permission rule based at least in part on receipt of the data indicative of the change in the group membership status of the entity.

Figure 5:
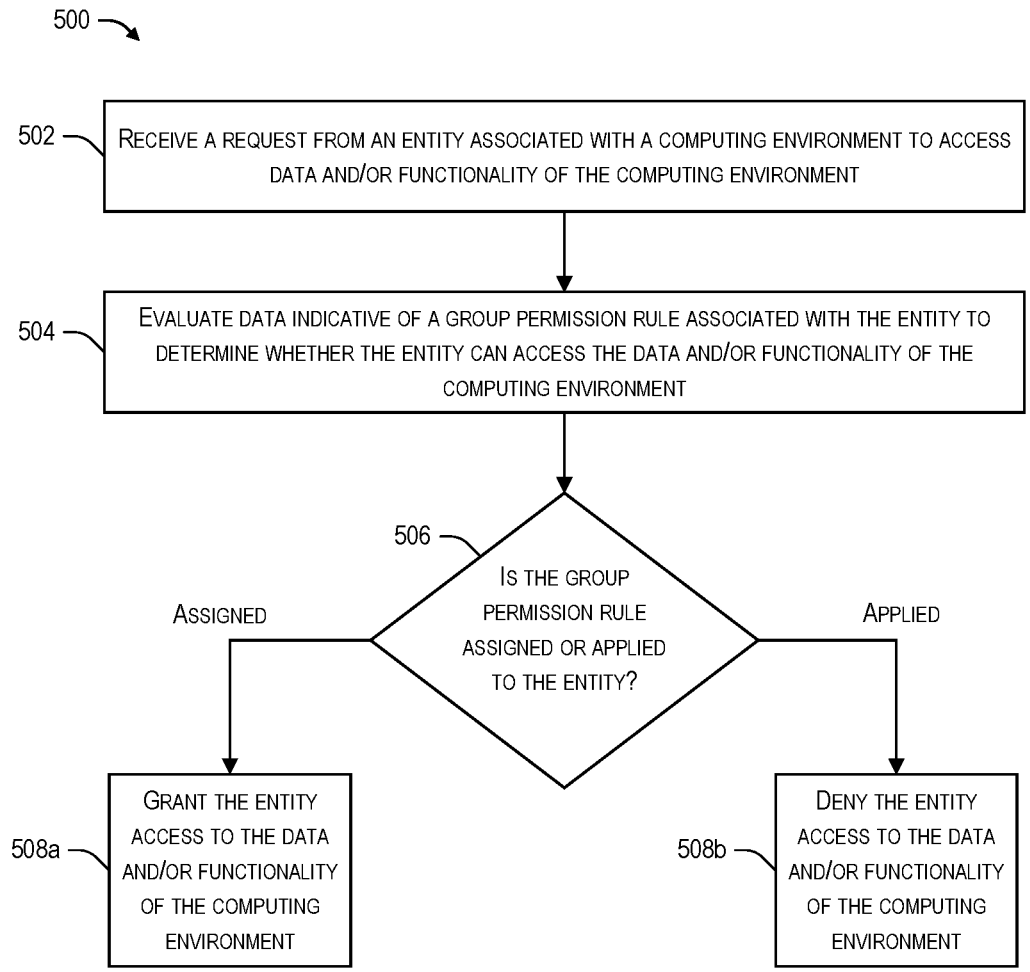

FIG. 5 depicts a flow diagram of an example, non-limiting computer-implemented method that can facilitate assignment and/or dynamic application of a permission rule to a group of entities associated with a computing environment in accordance with one or more embodiments of the present disclosure. One or more portions of computer-implemented method 500 can be executed and/or implemented on one or more computing devices or computing systems including, for example, computing system 110, remote computing system 130, one or more computing devices 152, and/or computing device 200. Further, one or more portions of computer-implemented method 500 can be executed and/or implemented as an algorithm and/or as machine-readable instructions (e.g., computer software) on the hardware devices and/or systems disclosed herein. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 502, computer-implemented method 500 can include receiving (e.g., by computing system 110) a request from an entity (e.g., an employee of an organization) associated with a computing environment (e.g., a computing system and/or computing network operated by and/or otherwise associated with an organization such as, for instance, a company) to access data and/or functionality of the computing environment. For example, in one or more embodiments described herein, computing system 110 can receive (e.g., via network 102) such a request from an entity operating a computing device (e.g., one or more computing devices 132, one or more computing devices 152, computing device 200, etc.) that can communicate with computing system 110.

At 504, computer-implemented method 500 can include evaluating (e.g., by computing system 110 and/or permission evaluator 314) data indicative of a group permission rule (e.g., a permission rule assigned to a group of entities) associated with the entity to determine whether the entity can access the data and/or functionality of the computing environment. For example, in one or more embodiments described herein, computing system 110 and/or permission evaluator 314 can access group-entity access control list 312 to evaluate at least one projection of a group permission rule onto an entity, where such at least one projection can be stored on group-entity access control list 312. In these one or more embodiments, such a group permission rule can constitute a permission rule assigned to a group of entities, where the entity is a member of the group of entities. In these one or more embodiments, based at least in part on such evaluation of the at least one projection, computing system 110 and/or permission evaluator 314 can determine whether the entity can access the data and/or functionality of the computing environment.

At 506, computer-implemented method 500 can include determining (e.g., by computing system 110 and/or permission evaluator 314) whether the group permission rule is assigned or applied to the entity. For example, in one or more embodiments described herein, based at least in part on the above-described evaluation of the at least one projection onto the entity, computing system 110 and/or permission evaluator 314 can determine whether the permission rule is assigned or applied to the entity.

If it is determined at 506 that the group permission rule is assigned to the entity, at 508a, computer-implemented method 500 can include granting (e.g., by computing system 110 and/or permission evaluator 314) the entity access to the data and/or functionality of the computing environment. For example, in one or more embodiments described herein, if computing system 110 and/or permission evaluator 314 determine that the group permission rule is assigned to the entity, computing system 110 and/or permission evaluator 314 can grant the entity access to the data and/or functionality of the computing environment.

If it is determined at 506 that the group permission rule is applied to the entity, at 508b, computer-implemented method 500 can include denying (e.g., by computing system 110 and/or permission evaluator 314) the entity access to the data and/or functionality of the computing environment. For example, in one or more embodiments described herein, if computing system 110 and/or permission evaluator 314 determine that the group permission rule is applied to the entity, computing system 110 and/or permission evaluator 314 can deny the entity access to the data and/or functionality of the computing environment.

Numerous details are set forth in the foregoing description. However, it will be apparent to one of ordinary skill in the art having the benefit of this disclosure that the present disclosure can be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "determining," "identifying," "adjusting," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers , or other information storage device, data transmission device, or data processing device.

Certain examples of the present disclosure can relate to an apparatus for performing the operations described herein. This apparatus can include a computing device that is activated or reconfigured by a computer program comprising electronic instructions stored in the computing device. Such a computer program can be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the appended claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
one or more processors; and
one or more memory devices that store instructions that, when executed by the one or more processors, cause the computing system to perform operations, the operations comprising:
maintaining an object database comprising multiple objects respectively corresponding to multiple entities, the multiple objects comprising attributes that respectively correspond to the multiple entities;
defining a group of entities from the multiple entities, the group of entities comprising at least one common attribute from the multiple objects;
assigning a permission rule to the group of entities based at least in part on the at least one common attribute, the permission rule being indicative of an access right to access at least one of data or functionality of a computing environment, wherein based at least in part on evaluation of the permission rule a first entity to which the permission rule is assigned is granted access to the at least one of data or functionality of the computing environment and a second entity to which the permission rule is applied is denied access to the at least one of data or functionality of the computing environment;
storing in a group access control list a mapping of the permission rule to the group of entities, the group access control list comprising a first class instance of a first class in an object based model;
projecting the permission rule onto one or more entities in the group of entities based at least in part on assignment of the permission rule to the group of entities;
storing in a group-entity access control list at least one projection of the permission rule onto the one or more entities in the group of entities, the group-entity access control list comprising a second class instance of a second class in the object based model;
obtaining data indicative of a change in group membership status of an entity in the group of entities; and
updating a projection of the permission rule onto the entity to modify an association of the entity with at least one of the group of entities or the permission rule based at least in part on receipt of the data indicative of the change in the group membership status of the entity.

2. The computing system of claim 1, wherein the group of entities comprises at least one first entity to which the permission rule is assigned and at least one second entity to which the permission rule is applied.

3. The computing system of claim 1, wherein defining the group of entities from the multiple entities comprises:
employing a predefined query language to query the multiple objects to identify the group of entities comprising the at least one common attribute.

4. The computing system of claim 1, wherein the operations further comprise:
employing a predefined query language to query the multiple objects to identify at least one first entity to which the permission rule is assigned.

5. The computing system of claim 1, wherein the operations further comprise:
employing a predefined query language to query the multiple objects to identify at least one second entity to which the permission rule is applied.

6. The computing system of claim 1, wherein the operations further comprise:
evaluating at least one projection of the permission rule onto the one or more entities in the group of entities to determine whether the permission rule is assigned or applied to the one or more entities.

7. The computing system of claim 6, wherein the operations further comprise:
granting access to at least one of data or functionality of a computing environment based at least in part on a determination that the permission rule is assigned to the one or more entities.

8. A computer-implemented method to assign and dynamically apply a permission rule to a group of entities, the computer-implemented method comprising:
maintaining, by a computing system operatively coupled to one or more processors, an object database comprising multiple objects respectively corresponding to multiple entities, the multiple objects comprising attributes that respectively correspond to the multiple entities;
defining, by the computing system, a group of entities from the multiple entities, the group of entities comprising at least one common attribute from the multiple objects;
assigning, by the computing system, a permission rule to the group of entities based at least in part on the at least one common attribute, the permission rule being indicative of an access right to access at least one of data or functionality of a computing environment, wherein based at least in part on evaluation of the permission rule a first entity to which the permission rule is assigned is granted access to the at least one of data or functionality of the computing environment and a second entity to which the permission rule is applied is denied access to the at least one of data or functionality of the computing environment;
storing, by the computing system, in a group access control list a mapping of the permission rule to the group of entities, the group access control list comprising a first class instance of a first class in an object based model;
projecting, by the computing system, the permission rule onto one or more entities in the group of entities based at least in part on assignment of the permission rule to the group of entities;
storing, by the computing system, in a group-entity access control list at least one projection of the permission rule onto the one or more entities in the group of entities, the group-entity access control list comprising a second class instance of a second class in the object based model:
obtaining, by the computing system, data indicative of a change in group membership status of an entity in the group of entities; and
updating, by the computing system, a projection of the permission rule onto the entity to modify an association of the entity with at least one of the group of entities or the permission rule based at least in part on receipt of the data indicative of the change in the group membership status of the entity.

9. The computer-implemented method of claim 8, wherein the group of entities comprises at least one first entity to which the permission rule is assigned and at least one second entity to which the permission rule is applied.

10. The computer-implemented method of claim 8, wherein defining, by the computing system, the group of entities from the multiple entities comprises:
employing, by the computing system, a predefined query language to query the multiple objects to identify the group of entities comprising the at least one common attribute.

11. The computer-implemented method of claim 8, further comprising:
employing, by the computing system, a predefined query language to query the multiple objects to identify at least one of: one or more first entities to which the permission rule is assigned; or one or more second entities to which the permission rule is applied.

12. The computer-implemented method of claim 8, further comprising:
evaluating, by the computing system, at least one projection of the permission rule onto the one or more entities in the group of entities to determine whether the permission rule is assigned or applied to the one or more entities.

13. One or more tangible non-transitory computer-readable media storing computer-readable instructions that, when executed by one or more processors, cause the one or more processors to perform operations, the operations comprising:
maintaining an object database comprising multiple objects respectively corresponding to multiple entities, the multiple objects comprising attributes that respectively correspond to the multiple entities;
defining a group of entities from the multiple entities, the group of entities comprising at least one common attribute from the multiple objects;
assigning a permission rule to the group of entities based at least in part on the at least one common attribute, the permission rule being indicative of an access right to access at least one of data or functionality of a computing environment, wherein based at least in part on evaluation of the permission rule a first entity to which the permission rule is assigned is granted access to the at least one of data or functionality of the computing environment and a second entity to which the permission rule is applied is denied access to the at least one of data or functionality of the computing environment;
storing in a group access control list a mapping of the permission rule to the group of entities, the group access control list comprising a first class instance of a first class in an object based model;
projecting the permission rule onto one or more entities in the group of entities based at least in part on assignment of the permission rule to the group of entities;
storing in a group-entity access control list at least one projection of the permission rule onto the one or more entities in the group of entities, the group-entity access control list comprising a second class instance of a second class in the object based model;
obtaining data indicative of a change in group membership status of an entity in the group of entities; and
updating a projection of the permission rule onto the entity to modify an association of the entity with at least one of the group of entities or the permission rule based at least in part on receipt of the data indicative of the change in the group membership status of the entity.

14. The one or more tangible non-transitory computer-readable media of claim 13, wherein defining the group of entities from the multiple entities comprises:
employing a predefined query language to query the multiple objects to identify the group of entities comprising the at least one common attribute.

15. The one or more tangible non-transitory computer-readable media of claim 13, wherein the operations further comprise:
employing a predefined query language to query the multiple objects to identify at least one of: one or more first entities to which the permission rule is assigned; or one or more second entities to which the permission rule is applied.

16. The one or more tangible non-transitory computer-readable media of claim 13, wherein the operations further comprise:
evaluating at least one projection of the permission rule onto the one or more entities in the group of entities to determine whether the permission rule is assigned or applied to the one or more entities.

* * * * *